United States Patent [19]

Mahefkey

[11] Patent Number: 4,706,740
[45] Date of Patent: Nov. 17, 1987

[54] VENTABLE SURVIVABLE HEAT PIPE VAPOR CHAMBER SPACECRAFT RADIATOR

[75] Inventor: Edward T. Mahefkey, Beavercreek, Ohio

[73] Assignee: The United States of America as represented by the Secretary of the Air Force, Washington, D.C.

[21] Appl. No.: 24,489

[22] Filed: Mar. 11, 1987

[51] Int. Cl.[4] .............................................. F28D 15/02
[52] U.S. Cl. ........................... 165/104.14; 165/104.26; 165/104.27; 165/41; 165/911; 244/163
[58] Field of Search ....................... 165/104.14, 104.26, 165/104.27, 41, 911; 244/163

[56] References Cited

U.S. PATENT DOCUMENTS

| | | | |
|---|---|---|---|
| 3,090,212 | 5/1963 | Anderson et al. | 165/104.26 |
| 3,450,195 | 6/1969 | Schnacke | 165/104.26 |
| 3,490,718 | 1/1970 | Vary | 165/104.26 |
| 3,734,168 | 5/1973 | De Groote | 165/41 |
| 3,749,156 | 7/1973 | Eby et al. | 165/104.26 |
| 3,776,305 | 12/1973 | Simmons | 165/104.14 |
| 3,831,664 | 8/1974 | Pogson | 165/104.14 |
| 3,968,787 | 7/1976 | Basiulis | 165/104.26 |
| 4,073,284 | 2/1978 | Laing | 165/104.14 |
| 4,324,375 | 4/1982 | O'Neill | 165/104.14 |
| 4,402,358 | 9/1983 | Wolf . | |
| 4,583,587 | 4/1986 | Alario et al. | 165/41 |

OTHER PUBLICATIONS

T. Mahefkey and R. R. Barthelemy, "Heat Pipe Applications for Future Air Force Spacecraft", AIAA-80-1463, AIAA 15th Thermophysics Conference (Jul. 14-16, 1980).

Primary Examiner—Albert W. Davis, Jr.
Attorney, Agent, or Firm—Bobby D. Scearce; Donald J. Singer

[57] ABSTRACT

A system for radiating heat generated by a source of heat aboard a spacecraft or the like is described which comprises a pair of spaced heat pipes and a pair of spaced wall members having inner condensation surfaces and outer heat radiating surfaces bonded to the heat pipes and defining a vapor chamber, a rewet artery of capillary wicking material disposed within the vapor chamber between the heat pipes and extending substantially lengthwise of the vapor chamber, a source of expendable liquid heat exchange medium operatively connected to the rewet artery for maintaining an inventory of heat exchange medium within the vapor chamber, and a pressure relief valve on the vapor chamber for venting vapor overpressure. The condensation surfaces of the wall members include a multiplicity of capillary grooves extending between the rewet artery and the heat pipes to promote vapor condensation, to facilitate flow of condensate toward the heat pipes, and otherwise to maintain a liquid film inventory near the heat radiating surfaces of the wall members.

9 Claims, 5 Drawing Figures

VENTABLE SURVIVABLE HEAT PIPE VAPOR CHAMBER SPACECRAFT RADIATOR

RIGHTS OF THE GOVERNMENT

The invention described herein may be manufactured and used by or for the Government of the United States for all governmental purposes without the payment of any royalty.

BACKGROUND OF THE INVENTION

The present invention relates generally to heat radiating systems for orbiting spacecraft or the like, and more particularly to a heat exchange radiator for absorbing and surviving a laser strike.

In the operation of spacecraft in earth orbit, high peak power generation furing certain portions of the duty cycle ordinarily require that a radiator system for rejecting waste heat generated aboard the spacecraft be sized to accommodate large heat loads. However, survival of the radiator system is usually critical to the continued successful operation of systems aboard the spacecraft and large overall physical size of the radiator system make it vulnerable to both natural and military threats. Conventional heat radiators generally comprise two-phase (liquid/vapor), pure substance, closed systems having large radiating surfaces which are especially susceptible to damage by invasive laser radiation. A laser beam directed onto the liquid tube or heat pipe fin radiating surfaces of a conventional radiator system may cause overpressure and overheating within the system, which would result in destruction of onboard operating systems whose continued functioning requires efficient heat rejection.

The invention described herein solves or reduces in critical importance problems with conventional heat radiators for spacecraft by providing a two-phase (liquid/vapor) heat exchange radiator system having substantial resistance to damage by invasive laser irradiation. The radiator system of the invention comprises a pair of heat pipes for conducting heat from a system aboard a spacecraft, two thin heat conducting wall members bonded to the heat pipes, the inner condensation surfaces of the wall members and the heat pipes defining a vapor chamber and the outer surfaces of the wall members defining heat radiating surfaces, a rewet artery of rolled or other suitably configured wicking material disposed within the vapor chamber between the heat pipes and extending substantially lengthwise of the vapor chamber, a pressure relief valve on the vapor chamber for venting vapor overpressure, and a source of expendable heat exchange medium operatively connected to the rewet artery for maintaining a liquid inventory on the condensation surfaces and for replacing vented vaporous heat exchange medium. The condensation surfaces have capillary grooves to maintain a liquid film inventory near the radiating surface and to provide high heat flux tolerance against failure of the wall members. The vapor chamber may comprise a compartmentalized structure for enhanced survivability of the overall system, each vapor chamber compartment including a relief valve.

It is therefore a principal object of the invention to provide an improved heat radiator system for spacecraft or the like.

It is another object of the invention to provide a heat radiator system having enhanced resistance to damage by invasive laser radiation.

It is a further object of the invention to provide a ventable waste heat radiator system for spacecraft.

These and other objects of the invention will become apparent as the detailed description of representative embodiments proceeds.

SUMMARY OF THE INVENTION

In accordance with the foregoing principles and objects of the invention, a system for radiating heat generated by a source of heat aboard a spacecraft or the like is described which comprises a pair of spaced heat pipes and a pair of spaced wall members having inner condensation surfaces and outer heat radiating surfaces bonded to the heat pipes and defining a vapor chamber, a rewet artery of capillary wicking material disposed within the vapor chamber between the heat pipes and extending substantially lengthwise of the vapor chamber, a source of expendable liquid heat exchange medium operatively connected to the rewet artery for maintaining an inventory of heat exchange medium within the vapor chamber, and a pressure relief valve on the vapor chamber for venting vapor overpressure. The condensation surfaces of the wall members include a multiplicity of capillary grooves extending between the rewet artery and the heat pipes to promote vapor condensation, to facilitate flow of condensate toward the heat pipes, and otherwise to maintain a liquid film inventory near the heat radiating surfaces of the wall members.

DESCRIPTION OF THE DRAWING

The invention will be more fully understood from the following detailed description of representative embodiments thereof read in conjunction with the accompanying drawing wherein.

DETAILED DESCRIPTION

Figure 1:
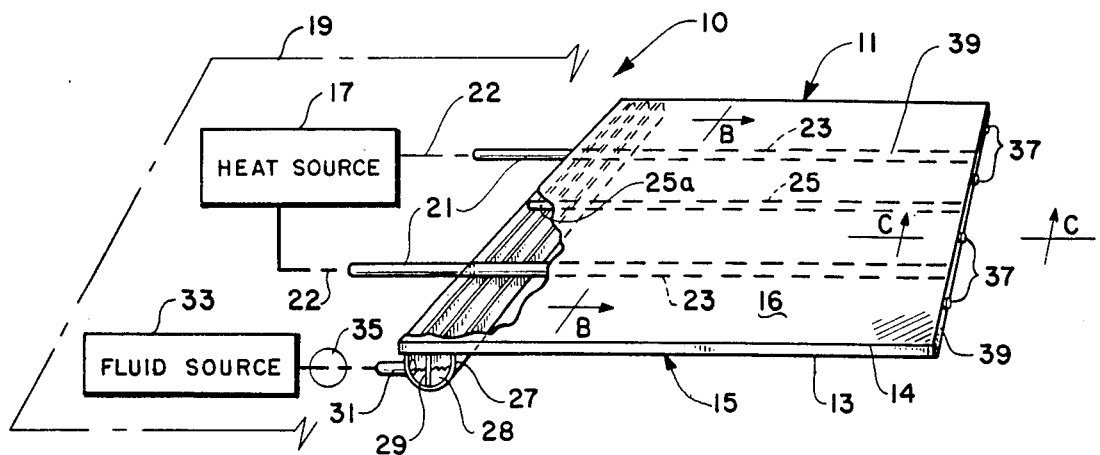
FIG. 1 is a schematic in partial perspective of the radiator system of the invention.

Referring now to FIG. 1 of the drawings, shown therein is a schematic of a representative radiator system 10 of the invention, including in perspective and partial section the vapor chamber, heat pipes, rewet artery, liquid reservoir and resupply wick of the system. System 10 includes one or more vapor chambers 11 defined by thin, heat conducting wall members (walls) 13,14 further defining outer heat radiating surfaces 15,16 and inner vapor condensing surfaces. The internal structure of vapor chamber 11 and of the vapor condensing surfaces are described below in relation to FIG. 2. System 10 is operatively connected to a source of heat 17 which may form an integral part of a spacecraft 19 or other vehicle (represented by peripheral broken line) enclosing systems from which heat is to be rejected in the operation of the invention. A pair of heat pipes 21 operatively interconnects heat source 17 and system 10. Heat pipes 21 may be of substantially conventional structure for the efficient transfer of heat from heat source 17 to system 10, the specific configuration for each heat pipe 21 not being limiting of the invention. The evaporator (hot) end 22 of each heat pipe 21 is thermally interfaced with heat source 17. The condensor (cold) end 23 of each heat pipe 21 comprises an elongated section extending substantially the length of walls 13,14 as suggested by broken lines in FIG. 1. Condensor ends 23 of heat pipes 21 are bonded to the inner surfaces of walls 13,14 to define a substantially closed chamber 11 between each pair of heat pipes 21 and walls 13,14. It is noted that the configuration of FIG. 1 suggests one pair of heat pipes 21, although a greater number of heat pipes may be included consistent with the selected size of radiating surfaces 15,16, to define correspondingly greater number of chambers 11 in a compartmentalized structure having enhanced resistance to potentially destructive invasive radiation. Such a structure provides an additional measure of resistance to damage from micrometeoroid impact or laser strike since failure of one compartment does not prevent operation of the remaining compartments. A rewet artery 25 in the form of continuously rolled (or other suitably configured) capillary wicking material is disposed between heat pipes 21 and extends substantiall6y lengthwise of vapor chamber 11. A more detailed description of the structure of vapor chamber 11, rewet artery 25 and heat pipes 21 appears below in relation to FIG. 2.

At one end of vapor chamber 11 may be disposed reservoir 27 for containing a reserve of liquid heat exchange medium maintained in operative contact with one end 25a of rewet artery 25. Reservoir 27 may include a wicking element 29 operatively connected to end 25a of each rewet artery 25 to supply liquid heat exchange medium to rewet artery 25 by capillary action. Inlet 31 of reservoir 27 is operatively connected to a source 33 of (normally liquid) heat exchange medium 28. Source 33 resupplies system 10 with heat exchange medium 28 as needed in the operation of system 10 as hereinafter described, and may further comprise a low pressure, low flow rate pump 35 (e.g., a low pressure operating aspiration pump) as appropriate for supplying medium 28 to reservoir 27 in the operation of system 10. Reservoir 27 is sized to contain an appropriate volume of liquid medium 28, such as to accommodate multiple heat load events as hereinbelow described. The near earth space environment of orbits of interst has temperature which averages about 250° K., and electronic components comprising certain operating systems of orbiting spacecraft have representative mean time to failure of about $10^4$ hours at 475° K. which time reduces rapidly with elevated temperature to about $10^2$ hours at about 575° K. Accordingly, at operating temperatures of about 300°–400° K., water, ammonia, methanol and freons may be appropriate media 28. At higher temperatures to about 1000° K., liquid metals such as mercury, potassium, sodium, and lithium and eutectic mixtures thereof may be suitable. Walls 13,14 may typically comprise thin (0.005–0.01 inch) sheet material of aluminum, titanium, metal-graphite composite, steel, niobium, or other material having equivalent temperature resistant, heat radiating, and thermostructural/thermomechanical properties.

One or more spring loaded pressure relief valves 37 (FIG. 3) are disposed n an end wall 39 of vapor chamber 11 generally opposite reservoir 27 for venting vapor pressure in excess of a preselected pressure value.

Vapor chamber 11 may have any overall shape suitable for the radiation of heat according to the principles governing operation of the invention as would occur to one with skill in the field of the invention, the flat, hollow fin-shaped structure of FIG. 1 being representative of various alternative structures. The flat structure of FIG. 1 is characterized by a large ratio of heat radiating surface area to vapor chamber volume and is appropriate for certain heat rejection applications, although it is understood that the invention contemplates a heat rejection structure having smaller surface to volume ratio (e.g., spherical or cylindrical structures) for other applications.

Figure 2:
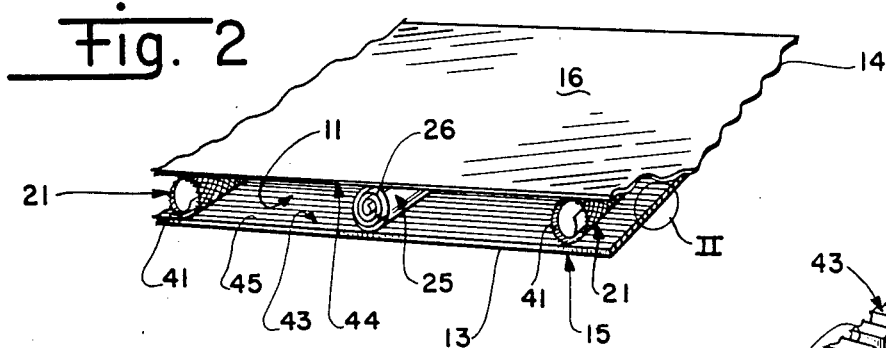
FIG. 2 is an enlarged fragmentary view along line B—B of FIG. 1 showing internal structure of the vapor chamber, rewet artery and heat pipes.

Referring now to FIG. 2, shown therein is an enlarged fragmentary view along line B—B of FIG. 1 of a representative internal structure for a vapor chamber 11 compartment. Each vapor chamber 11 is defined between a pair of heat pipes 21, each bonded lengthwise to walls 13,14 to provide a substantially hermetically sealed vapor chamber of preselected volumetric size. Each heat pipe 21 may preferably have on its surface means for promoting flow of liquid heat exchange medium 28 along the length of heat pipe 21 for efficient het exchange between heat exchange medium 28 and the condensor end 23 of heat pipe 21. The flow promoting means on the surface of heat pipe 21 may be in the form of small (approx 0.005 inch) grooves for promoting flow by capillary action along the length of heat pipe 21, or may be in the form of metal screening 41 surrounding the surface of heat pipe 21.

A rewet artery 25 having one end in operative liquid capillary flow communication with reservoir 27 as described above is disposed between each pair of heat pipes 21. The contact of rewet artery 25 with reservoir 27 maintains an inventory of liquid heat exchange medium 28 in rewet artery 25 at substantial saturation in equilibrium with vaporous heat exchange medium 28 within vapor chamber 11. Rewet arteries 25 may comprise substantially any conventional wicking material 26, as would be occur to one with skill in the applicable field, depending on the particular heat rejection requirements, operating temperature and selected heat exchange medium 28 for system 20 in the efficient capillary transfer of liquid medium 28 from reservoir 27 as needed in the operation of system 10 according to the governing principles of the invention. Accordingly, rewet arteries 25, as well as wicking element 29, may comprise rolled screen, slotted tubes, sintered metal foams and felts, and porous polymer wetting materials as a nonlimiting representative group.

Figure 2A:
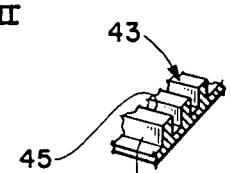
FIG. 2a is a fragmentary view of one representative capillary groove configuration for the inner surface of the vapor chamber.
Figure 2B:
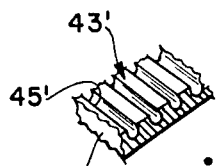
FIG. 2b is a fragmentary view of a second representative capillary groove configuration.

In the operation of system 10, liquid heat exchange medium 28 contacts condensor end 23 of heat pipe and is vaporized by the absorption of heat from heat pipe 21. Vaporous medium 28 fills vapor chamber 11 in heat exchange relationship with condensing surfaces 43,44 defined on the respective inner surfaces of walls 13,14 and condenses thereon as heat is radiated from outer surfaces 15,16. Condensed heat exchange medium 28 then flows along surfaces 43,44 toward heat pipes 21. In order to promote the condensation of heat exchange medium 28 onto surfaces 43,44 and condensate flow therealong toward heat pipes 21, a multiplicity of capillary tubes, grooves or channels 45 (typically about 0.005 inch) may be included in condensing surfaces 43,44 and traversing surfaces 43,44 between rewet artery 25 and heat pipes 21. As shown in FIGS. 2a and 2b, each being a representative enlarged view of FIG. 2 at II, grooves 45 may have a square cross section, or an inverted meniscus 45' cross section, both structures being substantially conventional for the intended condensing and flow promoting purposes.

Each portion of vapor chamber 11 defined by condensing surfaces 43,44 rewet artery 25 and a heat pipe 21 therefore substantially defines a heat pipe of substantially rectangular cross section having the evaporator end thereof along condensing end 23 of heat pipe 21 and a condensing end along condensing surfaces 43,44 and rewet artery 25.

Figure 3:
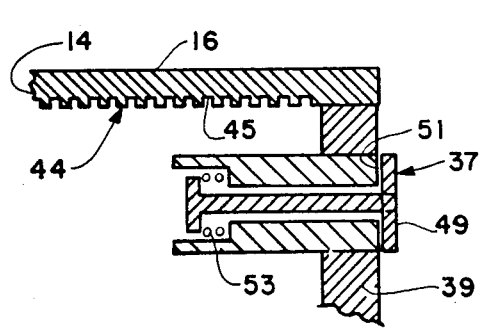
FIG. 3 is an enlarged sectional view along line C—C of FIG. 1 showing a typical pressure relief valve structure.

Referring now to FIG. 3, shown therein is an enlarged sectional view along line C—C of FIG. 1 showing representative structure of end wall 39 of vapor chamber 11 including pressure relief valve 37. As suggested in FIG. 3, valve 37 may comprise any suitable relief valve which opens in response to preselected pressure buildup within vapor chamber 11. Accordingly, valve 37 may comprise a valve element 49 of suitable shape held normally closed against a seal as at 51 by a spring such as suggested at 53.

In the event of the imposition of a substantial concentrated heat load on vapor chamber 11, as by the irradiation thereof by an invasive, potentially destructive laser beam, condensate on condensing surfaces 43,44 is rapidly evaporated and pressure within vapor chamber 11 increases correspondingly. Rewet arteries 25 are preferably sized to hold a sufficient inventory of liquid heat exchange medium 28 to accommodate the rapid evaporation. At preselected pressure, valve(s) 37 vent excess pressure overboard of system 10. Simultaneously, liquid inventory from rewet artery 25 spreads over condensing surfaces 43,44 through grooves 45, and rewet artery 25 is replenished with liquid heat exchange medium 28 from reservoir 27 through capillary action of rewet artery 25. In order to provide sufficient capillary driving force to promote flow from rewet artery 25 to grooves 45, the overall porosity of rewet artery 25 should be selected to be greater than that represented by the selected groove 45 size. In order to provide for possible rapid depletion of heat exchange medium, as upon the imposition of a substantial and continued invasive heat load, rewet artery 25 may be configured so that additional liquid heat exchange medium 28 is upon demand supplied by pump 35 directly to rewet artery 25 and vapor chamber 11.

The invention therefore provides a novel radiator system for surviving a high heat flux level such as that associated with the strike of an invasive laser beam. It is understood that certain modifications to the invention as described may be made, as would occur to one with skill in the field of the invention, within the scope of the appended claims. Accordingly, all embodiments contemplated hereunder which achieve the objects of the invention have not been shown in complete detail. Other embodiments may be developed without departing from the spirit of the invention or from the scope of the appended claims.

I claim:

1. A system for radiating heat generated by a source of heat aboard a spacecraft or the like, which comprises:
   (a) a pair of heat pipes, each heat pipe having an evaporator end for thermally interfacing said source of heat and an elongated condensor end, the respective condensor ends of said heat pipes being disposed in spaced relationship to each other;
   (b) a pair of spaced heat conducting wall members having first and second ends and being bonded to said heat pipes with said heat pipes therebetween, said wall members defining respective outer heat radiating surfaces and inner condensation surfaces, said condensation surfaces and said heat pipes defining therebetween a substantially closed vapor chamber of preselected size and configuration having an inlet at corresponding first ends of said wall members and an outlet at corresponding second ends of said wall members;
   (c) a rewet artery, including capillary wicking material having first and second ends, disposed within said vapor chamber between said condensor ends of said heat pipes, said first end of said rewet artery communicating with said inlet of said vapor chamber;
   (d) a source of liquid heat exchange medium operatively connected in liquid flow communication with said vapor chamber inlet;
   (e) means on said condensation surfaces of said wall members for promoting condensation of vaporous heat exchange medium and for facilitating flow of condensed heat exchange medium generally toward said heat pipes; and
   (f) a pressure relief valve disposed at said outlet of said vapor chamber for venting said vapor chamber when the pressure therein exceeds a preselected level.

2. The system of claim 1 wherein said source of liquid heat exchange medium includes means defining a reservoir operatively connected to said inlet of said vapor chamber and communicating with said rewet artery for containing a reserve of said liquid heat exchange medium, and a wicking element disposed within said reservoir and operatively connected to said first end of said rewet artery for supplying liquid heat exchange medium to said rewet artery by capillary action.

3. The system of claim 2 wherein said rewet artery and said wicking element comprise a wicking material selected from the group consisting of rolled screen, a slotted tube, sintered metal foam, metal felt and porous polymer wetting material.

4. The system of claim 1 wherein said means on said condensation surfaces of said wall members for promoting condensation and facilitating flow comprises a multiplicity of capillary grooves.

5. The system of claim 1 wherein said first and second wall members comprise a material selected from the group consisting of aluminum, titanium, metal-graphite composite, steel and niobium.

6. The system of claim 1 wherein said liquid heat exchange medium comprises a material selected from the group consisting of water, ammonia, methanol and freon.

7. The system of claim 1 wherein said liquid heat exchange medium comprises a liquid metal.

8. The system of claim 7 wherein said liquid metal is selected from the group consisting of mercury, potassium, sodium and lithium.

9. The system of claim 7 wherein said liquid metal is a eutectic mixture of metals selected from the group consisting of mercury, potassium, sodium and lithium.

* * * * *